US008836282B2

(12) United States Patent  
Chen et al.

(10) Patent No.: US 8,836,282 B2  
(45) Date of Patent: *Sep. 16, 2014

(54) METHOD AND APPARATUS FOR RECHARGING BATTERIES IN A MORE EFFICIENT MANNER

(71) Applicant: Superior Communications, Inc., Irwindale, CA (US)

(72) Inventors: George Chen, Chatsworth, CA (US); Harry Mkhitarian, Altadena, CA (US); Samuel Sentosa, Chino, CA (US); David P. Su, Montebello, CA (US)

(73) Assignee: Superior Communications, Inc., Irwindale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/182,127

(22) Filed: Feb. 17, 2014

(65) Prior Publication Data

US 2014/0159649 A1 Jun. 12, 2014

Related U.S. Application Data

(63) Continuation of application No. 13/649,004, filed on Oct. 10, 2012, now Pat. No. 8,653,789, which is a continuation of application No. 12/607,946, filed on Oct. 28, 2009, now abandoned.

(51) Int. Cl.  
*H02J 7/00* (2006.01)

(52) U.S. Cl.  
CPC .............. *H02J 7/0052* (2013.01); *H02J 7/0055* (2013.01); *H02J 7/0036* (2013.01); *H02J 2007/0049* (2013.01)  
USPC ............................ 320/111; 320/103; 320/138

(58) Field of Classification Search  
USPC ........ 320/103, 107, 111, 138; 307/43–46, 48, 307/64–67  
See application file for complete search history.

(56) References Cited

U.S. PATENT DOCUMENTS

| 2,484,092 | A | 10/1949 | Hopgood |
| 2,706,225 | A | 4/1955 | Freeman |

(Continued)

FOREIGN PATENT DOCUMENTS

| DE | 19635826 | 3/1998 |
| DE | 19808089 | 9/1999 |

(Continued)

OTHER PUBLICATIONS

Mozar; "Intelligent Standby Concept"; IEEE Transactions on Consumer Electronics; vol. 46; No. 1; pp. 179-182; Feb. 2000.

(Continued)

*Primary Examiner* — Richard V Muralidar  
(74) *Attorney, Agent, or Firm* — Snell & Wilmer LLP

(57) ABSTRACT

A battery charger including a converter unit, a terminal adaptor, a cable, a battery, and/or multiple power connectors. A terminal, such as an electronic device, can be connected to the converter unit using the cable or directly to the converter unit without the cable. The converter unit determines when to draw power from an external power and when to cease drawing power from the external power source by detecting a power enablement condition or a power disablement condition. The power disablement condition occurs when the terminal is fully charged, the terminal is disconnected from the converter unit, and/or a charge time of the terminal exceeds the predetermined charge time threshold. The power enablement condition occurs when the terminal is initially connected to the converter unit and/or the terminal needs to be charged. The battery supplies power to components of the converter unit and/or the terminal.

20 Claims, 8 Drawing Sheets

(56) References Cited

U.S. PATENT DOCUMENTS

| | | |
|---|---|---|
| 2,885,623 A | 4/1959 | Staufenber et al. |
| 2,920,260 A | 1/1960 | Goffstein |
| 3,921,050 A | 11/1975 | Rowas |
| 4,035,709 A | 7/1977 | Seider et al. |
| 4,382,221 A | 5/1983 | Reynolds |
| 4,482,789 A | 11/1984 | McVey |
| 4,544,909 A | 10/1985 | Di Nunzio |
| 4,595,872 A | 6/1986 | Ball |
| 4,675,537 A | 6/1987 | Mione |
| 4,888,495 A | 12/1989 | Feron et al. |
| 5,324,990 A | 6/1994 | Cunningham |
| 5,345,360 A | 9/1994 | Crane |
| 5,355,073 A | 10/1994 | Nguyen |
| 5,477,279 A | 12/1995 | Chang |
| 5,497,067 A | 3/1996 | Shaw |
| 5,563,455 A | 10/1996 | Cheng |
| 5,565,714 A | 10/1996 | Cunningham |
| 5,574,319 A | 11/1996 | Bennett |
| 5,602,455 A | 2/1997 | Stephens et al. |
| 5,636,110 A | 6/1997 | Lanni |
| 5,642,004 A | 6/1997 | Bircher |
| 5,654,593 A | 8/1997 | Murata |
| 5,720,628 A | 2/1998 | Usui et al. |
| 5,731,947 A | 3/1998 | Hirose |
| 5,734,206 A | 3/1998 | Keizer et al. |
| 5,760,491 A | 6/1998 | Kalin |
| 5,793,125 A | 8/1998 | Tarng |
| 5,825,100 A | 10/1998 | Kim |
| 5,844,326 A | 12/1998 | Proctor et al. |
| 5,847,545 A | 12/1998 | Chen et al. |
| 6,005,368 A | 12/1999 | Frame |
| 6,052,291 A | 4/2000 | Suzuki et al. |
| 6,092,207 A | 7/2000 | Kolinski et al. |
| 6,204,637 B1 | 3/2001 | Rengan |
| 6,255,800 B1 | 7/2001 | Bork |
| 6,272,030 B1 | 8/2001 | Oomura |
| 6,292,233 B1 | 9/2001 | Erba et al. |
| 6,307,762 B1 | 10/2001 | Shiobara |
| 6,316,844 B1 | 11/2001 | Arima |
| 6,339,314 B1 | 1/2002 | Bruning |
| 6,362,610 B1 | 3/2002 | Yang |
| 6,376,938 B1 | 4/2002 | Williams |
| 6,414,864 B1 | 7/2002 | Hoshi |
| 6,445,086 B1 | 9/2002 | Houston |
| 6,489,725 B1 | 12/2002 | Suzuki et al. |
| 6,496,390 B2 | 12/2002 | Yang |
| 6,509,658 B1 | 1/2003 | Kim |
| 6,586,849 B2 | 7/2003 | Tarr |
| 6,590,304 B1 | 7/2003 | Manning |
| 6,605,926 B2 | 8/2003 | Crisp et al. |
| 6,612,875 B1 | 9/2003 | Liao |
| 6,636,026 B1 | 10/2003 | Nomoto |
| 6,647,537 B1 | 11/2003 | Hepper et al. |
| 6,671,814 B1 | 12/2003 | Kubo et al. |
| 6,683,439 B2 | 1/2004 | Takano et al. |
| 6,710,553 B2 | 3/2004 | Logan |
| D490,058 S | 5/2004 | Mkhitarian |
| 6,754,092 B2 | 6/2004 | McDowell et al. |
| 6,777,828 B1 | 8/2004 | Rothstein |
| 6,780,048 B2 | 8/2004 | Chen et al. |
| 6,802,741 B1 | 10/2004 | Shatkin |
| 6,808,400 B2 | 10/2004 | Tu |
| 6,874,093 B2 | 3/2005 | Bell |
| 6,879,892 B2 | 4/2005 | Matsumoto |
| 6,895,516 B2 | 5/2005 | Odaohhara |
| 6,940,272 B2 | 9/2005 | Niv |
| 6,956,353 B1 | 10/2005 | Klitzner |
| 6,961,856 B1 | 11/2005 | Kouropoulus |
| 6,986,067 B2 | 1/2006 | Odaohhara et al. |
| 6,987,334 B2 | 1/2006 | Kochler |
| 7,000,127 B2 | 2/2006 | D'Alessio |
| 7,035,126 B1 | 4/2006 | Lanni |
| 7,062,191 B2 | 6/2006 | Matsukura |
| 7,101,226 B1 | 9/2006 | Gilliland |
| 7,122,918 B2 | 10/2006 | Rose |
| 7,132,757 B2 | 11/2006 | Steigerwald et al. |
| 7,132,763 B2 | 11/2006 | Rendie |
| 7,184,258 B2 | 2/2007 | Lai |
| 7,224,086 B2 | 5/2007 | Germagian et al. |
| 7,235,950 B2 | 6/2007 | Young et al. |
| 7,249,976 B1 | 7/2007 | Watson |
| 7,250,694 B2 | 7/2007 | Lin |
| 7,287,705 B2 | 10/2007 | Tang |
| 7,315,097 B2 | 1/2008 | Tajika |
| 7,394,397 B2 | 7/2008 | Nguyen |
| 7,411,317 B2 | 8/2008 | Liu |
| 7,444,530 B2 | 10/2008 | Deppe et al. |
| 7,466,042 B2 * | 12/2008 | Eldredge ..................... 307/154 |
| 7,156,343 B2 | 4/2009 | Bhogal et al. |
| 7,530,823 B1 | 5/2009 | Thornton et al. |
| 7,534,957 B2 * | 5/2009 | Yamaura et al. ............... 174/36 |
| 7,560,907 B2 | 7/2009 | Nelson |
| 7,597,570 B2 | 10/2009 | So |
| 7,635,273 B2 | 12/2009 | Buzil et al. |
| 7,765,416 B2 | 7/2010 | Zhou |
| 7,782,642 B2 | 8/2010 | Unger et al. |
| 7,784,610 B2 | 8/2010 | Mason |
| 7,800,251 B2 | 9/2010 | Hodges et al. |
| 7,800,351 B2 | 9/2010 | Gan |
| 7,816,808 B2 | 10/2010 | Menas et al. |
| 7,830,041 B2 | 11/2010 | Yang et al. |
| 7,843,088 B2 | 11/2010 | Perper et al. |
| 7,910,833 B2 | 3/2011 | McGinley et al. |
| 7,910,834 B2 | 3/2011 | McGinley et al. |
| 7,923,869 B2 | 4/2011 | Bagenholm et al. |
| 7,960,648 B2 | 6/2011 | McGinley et al. |
| 7,977,823 B2 | 7/2011 | DuBose et al. |
| 7,977,825 B2 | 7/2011 | Gilbert |
| 8,030,890 B2 | 10/2011 | Hyatt |
| 8,046,612 B2 | 10/2011 | Shen et al. |
| 8,238,580 B2 | 8/2012 | Hofrichter |
| 8,653,789 B2 * | 2/2014 | Chen et al. .................... 320/111 |
| 2002/0008979 A1 | 1/2002 | Nagai et al. |
| 2003/0042796 A1 | 3/2003 | Siu |
| 2003/0178977 A1 | 9/2003 | Wu |
| 2003/0230934 A1 | 12/2003 | Cordelli et al. |
| 2004/0056533 A1 | 3/2004 | Chen |
| 2004/0085043 A1 | 5/2004 | Germagian et al. |
| 2004/0204170 A1 | 10/2004 | Mkhitarian |
| 2004/0204177 A1 | 10/2004 | Pon |
| 2004/0268163 A1 | 12/2004 | Yeh |
| 2005/0041360 A1 | 2/2005 | Dettweiler |
| 2005/0057218 A1 | 3/2005 | Chen |
| 2005/0168189 A1 | 8/2005 | Schweigert |
| 2005/0194935 A1 | 9/2005 | Kubota et al. |
| 2005/0221662 A1 | 10/2005 | Lai |
| 2005/0228934 A1 | 10/2005 | Tsutsui |
| 2005/0231870 A1 | 10/2005 | Tajika |
| 2005/0237036 A1 | 10/2005 | Nguyen et al. |
| 2005/0272292 A1 | 12/2005 | Oyama |
| 2006/0044858 A1 | 3/2006 | Pedersen et al. |
| 2006/0073717 A1 | 4/2006 | Ng et al. |
| 2006/0174141 A1 | 8/2006 | Chang |
| 2006/0202557 A1 | 9/2006 | Menas et al. |
| 2006/0226712 A1 | 10/2006 | Eldredge |
| 2006/0267459 A1 | 11/2006 | Shelby |
| 2006/0267549 A1 | 11/2006 | Kung |
| 2006/0273663 A1 | 12/2006 | Emalfarb |
| 2006/0292905 A1 | 12/2006 | Gilliland |
| 2007/0038334 A1 | 2/2007 | Chou et al. |
| 2007/0047270 A1 | 3/2007 | Makino et al. |
| 2007/0070558 A1 | 3/2007 | Liu |
| 2007/0126290 A1 | 6/2007 | Jaynes et al. |
| 2007/0141894 A1 | 6/2007 | McGinley et al. |
| 2007/0159348 A1 | 7/2007 | Kang et al. |
| 2007/0164704 A1 | 7/2007 | McGinley et al. |
| 2007/0222414 A1 | 9/2007 | Chen |
| 2007/0228831 A1 | 10/2007 | Eldredge |
| 2007/0273298 A1 | 11/2007 | Wu |
| 2007/0300089 A1 | 12/2007 | Bhogal et al. |
| 2008/0009145 A1 | 1/2008 | Zhou |
| 2008/0025058 A1 | 1/2008 | Gerber |
| 2008/0059816 A1 | 3/2008 | Paniagua et al. |
| 2008/0122292 A1 | 5/2008 | Minami |

(56) References Cited

U.S. PATENT DOCUMENTS

| | | | |
|---|---|---|---|
| 2008/0130340 A1 | 6/2008 | Unger et al. | |
| 2008/0157712 A1 | 7/2008 | Garcia | |
| 2008/0164768 A1 | 7/2008 | Litwack | |
| 2008/0211310 A1 | 9/2008 | Jitaru et al. | |
| 2008/0222431 A1 | 9/2008 | Paniagua et al. | |
| 2008/0247203 A1 | 10/2008 | Cassidy et al. | |
| 2008/0290731 A1 | 11/2008 | Cassidy | |
| 2009/0027922 A1 | 1/2009 | Tracy et al. | |
| 2009/0038927 A1 | 2/2009 | Guo et al. | |
| 2009/0177906 A1 | 7/2009 | Paniagua et al. | |
| 2009/0179610 A1 | 7/2009 | Lin | |
| 2009/0184586 A1 | 7/2009 | Bagenholm et al. | |
| 2009/0213630 A1 | 8/2009 | Wu | |
| 2009/0295233 A1 | 12/2009 | McGinley et al. | |
| 2011/0095728 A1* | 4/2011 | Chen et al. | 320/162 |
| 2011/0121656 A1* | 5/2011 | Hicks et al. | 307/80 |
| 2011/0260555 A1 | 10/2011 | McGinley et al. | |
| 2013/0096539 A1* | 4/2013 | Wood et al. | 606/1 |

FOREIGN PATENT DOCUMENTS

| | | |
|---|---|---|
| DE | 10056709 | 5/2002 |
| EP | 0759655 | 2/1997 |
| EP | 0875983 | 4/1998 |
| EP | 0982941 | 8/1999 |
| EP | 1122872 | 8/2001 |
| EP | 1137151 | 9/2001 |
| EP | 1225675 | 7/2002 |
| EP | 1513255 | 2/2004 |
| EP | 1460661 | 9/2004 |
| EP | 1473813 | 11/2004 |
| EP | 1783887 | 7/2005 |
| EP | 1708331 | 3/2006 |
| EP | 1868276 | 6/2006 |
| EP | 1832954 | 9/2007 |
| GB | 2218274 | 11/1989 |
| GB | 2386771 | 9/2003 |
| GB | 2430555 | 3/2007 |
| GB | 2436979 | 10/2007 |
| GB | 2438655 | 12/2007 |
| GB | 2443454 | 5/2008 |
| GB | 2443455 | 5/2008 |
| JP | 04-165957 | 6/1992 |
| JP | 05-95414 | 4/1993 |
| JP | 8179858 | 7/1996 |
| JP | 2001/267643 | 3/2000 |
| JP | 2000/152499 | 5/2000 |
| JP | 2002/186178 | 6/2002 |
| KR | 2003/0032392 | 4/2003 |
| WO | WO93/09634 | 5/1993 |
| WO | WO 95/10875 | 4/1995 |
| WO | WO 95/30183 | 11/1995 |
| WO | WO 98/38720 | 9/1998 |
| WO | WO 99/43074 | 8/1999 |
| WO | WO 00/59079 | 10/2000 |
| WO | WO 02/071573 | 9/2002 |
| WO | WO 03/048911 | 6/2003 |
| WO | WO 03096508 | 11/2003 |
| WO | WO 2007/027063 | 3/2007 |
| WO | WO 2008/062174 | 5/2008 |
| WO | WO 2009/146328 | 12/2009 |

OTHER PUBLICATIONS

Mundra et al.; "An Innovative Battery Charger for Safe Charging of NiMH/NiCd Batteries"; Aug. 2007.

Stewart; "Local man to sell revolutionary surge protector"; McClatchy—Tribune Business News; 3 pages; Dec. 4, 2007.

Watson; U.S. Appl. No. 60/744,014 "Combination Electrical Plug, Integral Twist Switch and Receptacle", filing Mar. 30, 2006; 7 pages.

Cassidy; U.S. Appl. No. 60/910,766 "Energy Efficient Power Converter", filing Apr. 9, 2007; 14 pages.

Bagenholm; U.S. Appl. No. 61/022,255 "Power Adaptor", filing Jan. 18, 2008; 15 pages.

Captain, Sean; "Green Plug's Digital Power"; Jan. 2008; 1 page.

Sheppard; "Eco Switch Newsletter"; 4 pages; Nov. 2007.

"Mini Power Minder turns off power for you"; 2 pages; Nov. 25, 2006.

"PowerKey Pro USB"; 3 pages; 2002.

"Turn off Peripherals at Shutdown; Our computers are connected to power strips, so one switch turns everything off."; PC Magazine; vol. 25; Iss. 8; 2 pages; May 9, 2006.

Benabdelaziz et al.; "AC Switches Control Energy Reduction"; IEEE; pp. 2036-2041; 2005.

Machrone; :The Electron Leak; Standby power could be costing us 10 percent of our total electrical energy usage; PC Magazine; vol. 23; Iss. 17; pp. 75; Oct. 5, 2004.

Idris et al.; "A Novel Automatic Electronic Resemble Circuit for Detecting & Switching off Failing Fluorescent Lamp"; IEEE PEDS 2001—Indonesia; pp. 819-821; 2001.

Guan-Chyun Hsieh et al.; "Fuzzy-Controlled Active State-of-Charge Controller for Fasting th e Charging Behavior of Li-ion Battery"; IEEE; pp. 400-405; 1999.

Diaz; "Intelligent and Universal Fast Charger for Ni-Cd and Ni-MH Batteries in Portable Applications"; IEEE Transactions on Consumer Electronics; vol. 51; No. 4; pp. 857-863; Aug. 2004.

Green Plug, One Plug—One Planet, (13 pages); http:/web.archive.org.web/2007011 []/www.greenplug.us/[]; Date Stamped: Nov. 2007 [p. 13 is PDF link from p. 11].

Excerpt from Nokia website, copyright 2009, Nokia (internet publication, 3 pages).

Excerpt from maemo.org blog(http://tallc.maemo.org/showthread.php?p=249860) , Dec. 16, 2008 (internet publication, 2 pages).

Excerpt from Energy Star Website (http://www.energystar.gov/index.cfm?c=archives.power_supplies), captured May 28, 2013 (internet publication, 1 page).

TLC Direct, 13 Amp RCD Adaptor, www.tlc-direc.co-uk. Internet publication (2 pages); BRJ03; Date Stamped: Nov. 22, 2007.

* cited by examiner

METHOD AND APPARATUS FOR RECHARGING BATTERIES IN A MORE EFFICIENT MANNER

RELATED APPLICATIONS

The present application is a continuation of prior application Ser. No. 13/649,004, filed Oct. 10, 2012, which is a continuation of application Ser. No. 12/607,946, filed Oct. 28, 2009, the entire disclosure of these applications being incorporated herein by reference.

BACKGROUND

1. Field of the Invention

The present invention relates to a method and apparatus for recharging batteries in a more efficient manner, and more specifically to a method and apparatus for optimizing the operational and down time of chargers or power supplies.

2. Description of the Related Art

A conventional battery charger has one end connected to a power source and another end connected to an electronic device. The conventional battery charger draws power from the power source to supply to the electronic device. However, the conventional battery charger can draw power from the power source even when the electronic device is disconnected, or fully charged. In some situations, the excess consumption can be, for example, 15 mW or more. With the millions of power adapters in use today, this translates into a large amount of wasted energy and a negative effect on the environment.

Thus, there is a need for a method and apparatus for optimizing the operational and down time of chargers or power supplies.

SUMMARY

In one embodiment, the present invention includes a method and apparatus for optimizing the operational and down time of chargers or power supplies. A battery charger includes a converter unit and a cable. A terminal, such as an electronic device, can be connected to the converter unit using the cable or directly to the converter unit without the cable. The converter unit can determine when to draw power from an external power source and when to cease drawing power from the external power source by detecting a power enablement condition or a power disablement condition.

The power disablement condition can occur, for example, when the terminal is fully charged, the terminal is disconnected from the converter unit, and/or a charge time of the terminal exceeds the predetermined charge time threshold. This reduces an amount of power drawn by the battery charger when it would not be productive to be drawing power from the external power source. The converter unit can also periodically wake-up to monitor the terminal to determine whether the power disablement condition still exists. The power enablement condition can occur, for example, when the terminal is initially connected to the converter unit and/or the terminal needs to be charged. This allows the terminal to still be appropriately charged even when conserving energy.

The converter unit can also include a battery to supply power to components of the converter unit and/or the terminal when the converter unit ceases drawing power from the external power source. Thus, a monitoring function in the battery charger can remain functional even when it does not receive power from the external power source. Furthermore, the converter unit can also include a power input including multiple power connectors. This allows the power connector to receive power from a variety of power sources.

In one embodiment, the present invention includes an electric charge cutoff device including a terminal adapter connectable to a terminal, a cable connected to the terminal adapter, a power connector for receiving power from a power source, and a sensor circuit electrically coupled between the power source and the cable. The sensor circuit connects the cable to the power connector when a change in capacitance is detected from the cable or the terminal adapter is connected to the terminal. The sensor circuit can also optionally disconnect the cable from the power connector when no capacitance has been detected from the cable.

In another embodiment, the present invention is a battery charger including a converter unit connectable to a terminal and an external power source, wherein the converter unit disables reception of power from the external power source and disables a supply of power to the terminal when the converter unit detects a power disablement condition.

In yet another embodiment, the present invention is a battery charger including a latched relay connectable to an external power source, wherein the latched relay disables reception of power from the external power supply when a power disablement condition occurs and enables reception of power from the external power supply when a power enablement condition occurs, and a load monitor circuit connectable to a terminal, the load monitor circuit detecting when the load monitor circuit is electrically connected to the terminal and supplying power to the terminal when the power enablement condition occurs.

In still another embodiment, the present invention is a method for charging a battery including detecting when a terminal is connected to a converter unit, detecting a power disablement condition, disabling reception of power from an external power source when the power disablement condition is detected, and disabling a supply of power to the terminal when the power disablement condition is detected.

BRIEF DESCRIPTION OF THE DRAWINGS

The features, obstacles, and advantages of the present invention will become more apparent from the detailed description set forth below when taken in conjunction with the drawings, wherein.

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

Figure 1:
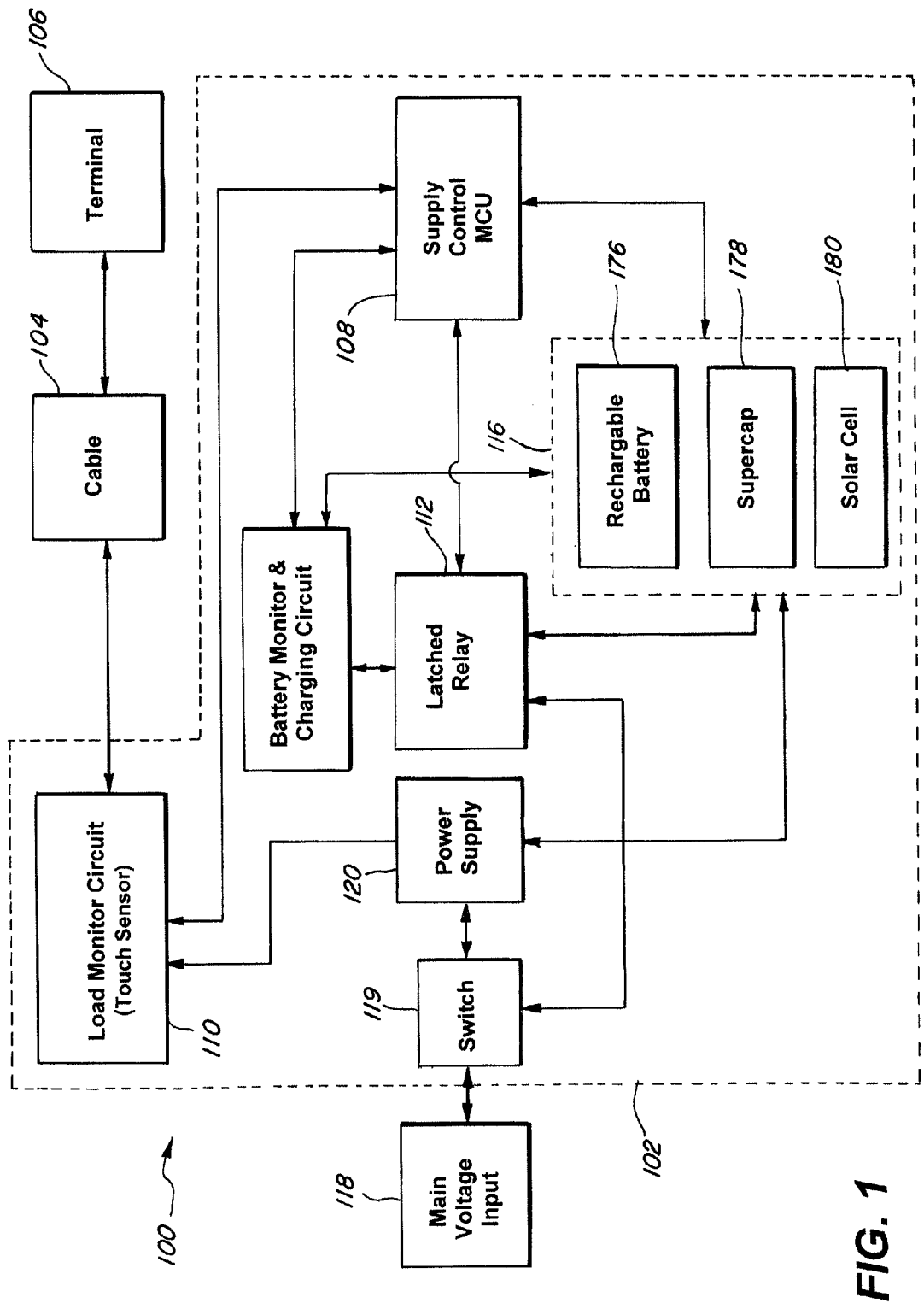
FIG. 1 is a block diagram of a battery charger according to an embodiment of the present invention.
Figure 2:
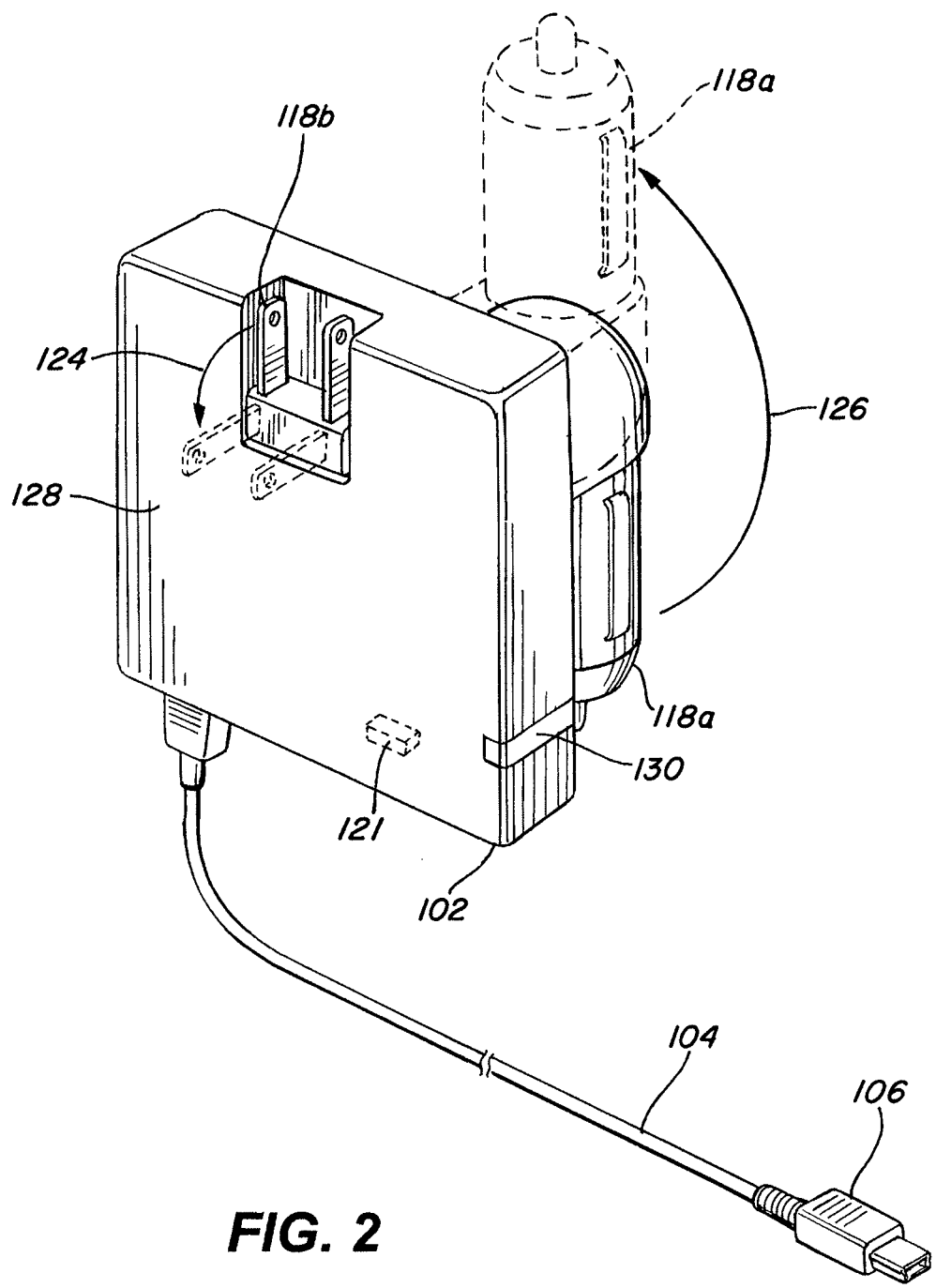
FIG. 2 is a perspective view of a battery charger according to an embodiment of the present invention.

FIG. 1 is a block diagram of a battery charger 100, while FIG. 2 is a perspective view of the battery charger. The battery charger 100 includes, for example, a converter unit 102, a cable 104, a terminal 106, and/or a main voltage input 118.

The terminal 106 is connected to the cable 104 and can be an electronic device. The terminal 106 can be, for example, a music player, a cell phone, a laptop, a desktop computer, a personal digital assistant (PDA), a camera, or any other type of electronic device which includes a rechargeable battery. In one embodiment, the converter unit 102 transmits power from the cable 104 to charge the terminal 106.

The cable 104 is connected to the converter unit 102 and the terminal 106. The cable 104 transmits power and/or information between the converter unit 102 and the terminal 106. The cable 104 can be any type of cable that can transmit power and/or information between the converter unit 102 and the terminal 106. The terminal 106 can be connected to the cable 104 using a terminal adapter 107 (FIG. 2). The terminal adapter 107 can be, for example, a universal serial bus (USB) adapter, an IEEE 1394 interface, a proprietary adapter specific to a terminal, or any other type of adaptor that can be used to charge the rechargeable battery in the terminal.

Figure 3:
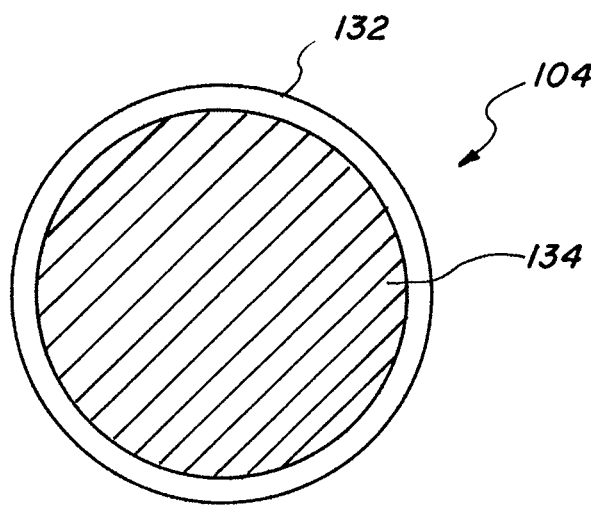
FIG. 3 is a sliced view of a cable according to an embodiment of the present invention.

FIG. 3 depicts the cable 104 at a plane perpendicular to an axial direction of the cable 104. As seen in FIG. 3, the cable 104 includes an outer shell 132 and a conductive material 134. The outer shell 132 can be formed, in part, from an insulating material such as plastic or rubber or any other type of insulating material. The conductive material 134 can be, for example, a copper based wire or any other type of conductive material. The conductive material 134 can transmit the power and/or information between the convert unit 102 and the terminal 106, while the outer shell 132 can insulate the conductive material 134 from outside elements.

The cable 104 can also have a capacitance, which will increase, for example, when a user touches or is touching the cable 104. The capacitance can be, for example, a capacitance of the outer shell 132. Thus, if a user touches the outer shell 132, for example, with two fingers, the capacitance of the outer shell 132 can increase. When the user touches the outer shell 132, a small current can flow through the user, increasing the capacitance of the outer shell 132. The capacitance of the cable 104 can be used, for example, to determine whether the terminal 106 is connected to the converter unit 102, which will be described later. Although FIG. 1 and FIG. 2 depict the use of the cable 104, the terminal 106 can also connect directly to the converter unit 102.

The main voltage input 118 is connected to the converter unit 102 and is connectable to an external power source. The main voltage input 118 can be, for example, a variety of power inputs such as a DC plug 118a and/or an AC plug 118b. The main voltage input 118 can be connected to an external power source and draw power from the external power source. The main voltage input 118 can also be any type of power connector that can receive power from the external power source. For example, the DC plug 118a can be connected to a DC outlet, such as a 12 V DC outlet, in an automobile. The AC plug 118b, for example, can be connected to an electrical socket, such as a 110 V or 120 V socket, in a conventional house. Although the main voltage input 118 includes the AC plug 118a and the DC plug 118b, the main voltage input 118 can include any number of power connectors.

The DC plug 118a and the AC plug 118b can also be placed in various positions depending on whether each of the components is in a storage mode or an active mode. This allows for the compact storage of the battery charger 100 when not in use, but allows the battery charger 100 to retain its functionality when it is ready for use.

The DC plug 118a can remain in a first position, such as a stored position, when the DC plug 118a is not in use and in a storage mode. The DC plug 118a can rotate in a direction 126 to a second position, such as an active position, when ready for use and in the active mode. Likewise, the AC plug 118b can remain in a first position, such as a stored position, when not in use and in a storage mode. The AC plug 118b can, for example, rotate in a direction 124 to a second position, such as an active position, when ready for use and in the active mode.

The converter unit 102 is connected to the cable 104 and/or the terminal 106. The converter unit 102 can also be directly connected to the terminal 106 without the cable 104. As seen in FIG. 1, the converter unit 102 includes a microcontroller 108, a load monitor circuit 110, a latched relay 112, a battery monitor and charging circuit 114, a battery 116, and a power supply 120.

The load monitor circuit 110 is connectable to the terminal 106 either directly or through the cable 104. The load monitor circuit 110 is also electrically connected to the microcontroller 108, and/or the power supply 120. The load monitor circuit 110 can include a sensor. The sensor can detect whether the terminal 106 is electrically connected to the converter unit 102. For example, the sensor can detect whether the terminal 106 is electrically connected to the load monitor circuit 110.

In one embodiment, to detect whether the terminal 106 is electrically connected to the battery charger 100, the sensor detects a capacitance of the terminal 106. For example, when a mobile phone is connected to the load monitor circuit, there will be an increase in capacitance.

In another embodiment, the sensor can detect whether the terminal 106 is electrically connected to the load monitor circuit 110 by detecting a capacitance increase in the cable 104. The capacitance increase can be caused, for example, by a user touching the cable 104. When the user touches the cable 104, it is likely that the user is connecting the terminal 106 to the battery charger 100 through, for example, the cable 104. This can indicate that the terminal 106 will be electrically connected to the load monitor circuit 110.

The power supply 120 is connected to the main voltage input 118 and/or the load monitor circuit 110. The power supply 120 is connected to the main voltage input 118 through a switch 119. The switch 119 can be connected or disconnected. When the switch 119 is disconnected, no power flows from the main voltage input 118 to the power supply 120. When the switch 119 is connected, power flows from the main voltage input 118 to the power supply 120. The power supply 120 can supply power to the load monitor circuit 110 and/or the terminal 106 when the switch 119 is connected.

The battery 116 is electrically connected to the latched relay 112, the microcontroller 118, and/or the power supply 120. The battery 116 can also be electrically connected to the terminal 106, for example, through the microcontroller 108 and/or the power supply 120. The battery 116 can supply power to the microcontroller 108 and/or the terminal 106.

The battery 116 can be charged by the external power source when the switch 119 is connected and when the latched relay 112 enables power to flow to the battery 116. When the switch 119 is disconnected, and/or the latched relay 112 disables power from flowing to the battery 116, the battery 116 does not receive power from the external power source. The battery 116 can include, for example, a rechargeable battery 176, a super capacitor ("supercap") 178, and/or a solar cell 180. The battery 116 can also include any other type of energy storage or renewable energy device which can be used to power the microcontroller 108 and/or the terminal 106. In one embodiment, the battery 116 can have an unlimited shelf life. Thus, the battery 116 can operate and hold for the life of the battery charger 100. Therefore, the battery 116 does not need to be replaced.

The battery monitor and charging circuit 114 is electrically connected to the latched relay 112, the microcontroller 108, and/or the battery 116. The battery monitor and charging circuit 114 can monitor an energy level of the battery 116.

The latched relay 112 is electrically connected to the switch 119, the battery 116, and/or the battery monitor and charging circuit 114. In one embodiment, the switch 119 can be part of the latched relay 112. The latched relay 112 can connect or disconnect the switch 119. When the switch 119 is disconnected, no power flows from the external power source through the main voltage input 118 to the power supply 120. When the switch 119 is connected, power can flow from the external power source through the main voltage input 118 to the power supply 120.

In one embodiment, when the switch 119 is disconnected, the terminal 106 is not charged. This is beneficial, for example, when the terminal 106 is already fully charged. In such a case, energy is prevented from being wasted by discontinuing the current flow from the external power source. The switch 119 can be positioned, for example, between the main voltage input and any component that creates a loading, such as the power supply 120. This allows the switch 119 to discontinue the current flow from the external power source to the terminal 106.

The latched relay 112 is electrically connected to the main voltage input 118, the power supply 120, the battery 116, the battery monitor and charging circuit 114, and/or the microcontroller 108. The latched relay 112 is also electrically connected to the switch 119. The latched relay 112 can connect or disconnect the switch 119 based on instructions from the microcontroller 108. The latched relay 112 can also enable or disable the supply of power to the battery 116 based on the instructions of the microcontroller 108.

The microcontroller 108 is electrically connected to the load monitor circuit 110, the battery monitor and charging circuit 114, the latched relay 112, and/or the battery 116. The microcontroller 108 can receive power from the external power source and/or the battery 116. For example, when the switch 119 is disconnected and the converter unit 100 does not receive power from the external power source, the battery 116 can supply power to the microcontroller 108. This allows the microcontroller 108 to operate even when the external power source is not supplying power to the converter unit 100. The microcontroller 108 receives information regarding the energy level of the battery 116 from the battery monitor and charging circuit 114. When the energy level of the battery 116 is below a predetermined energy level threshold, the battery 116 instructs the latched relay 112 to supply power to the battery 116. This guarantees that the microcontroller 108 will always have enough power to operate, even when the converter unit 102 is conserving energy by not drawing power from the external power source.

The microcontroller 108 can also detect a power disablement condition and a power enablement condition. During a power disablement condition, the microcontroller 108 instructs the latched relay 112 to disconnect the switch 119. By disconnecting the switch 119, power does not flow from the main voltage input 118 to the power supply 120, and the converter unit 102 ceases drawing power from the external power supply. This saves power since much of the power that is drawn by a battery charger during a power disablement condition is wasted.

The power disablement condition can be, for example, when the terminal 106 is electrically connected to the converter unit 102 and is fully charged. Thus, the microcontroller 108 can receive a signal from the load monitor circuit 110 indicating that the terminal 106 is connected to the converter unit 102. The microcontroller 108 can then detect a voltage and/or current of the terminal 106.

In one embodiment, when the voltage of the terminal 106 exceeds a predetermined voltage threshold, then the terminal 106 is fully charged. For example, if the voltage of the terminal 106 is 21 volts, and the predetermined voltage threshold is 20 volts, then the terminal 106 is fully charged. In another embodiment, when the current of the terminal 106 is below a predetermined current threshold, then the terminal 106 is fully charged. For example, if the current of the terminal 106 is 50 mA and the predetermined current threshold is 60 mA, then the terminal 106 is fully charged.

When the power disablement condition is detected, the microcontroller 108 instructs the latched relay 112 to disconnect the switch 119. Once the switch 119 is disconnected, the converter unit 102 ceases drawing power from the external power source, reducing energy consumption. Thus, the battery charger 100 does not draw power from the external power source, even when the battery charger 100 is connected to the external power source. However, if the voltage of the terminal 106 is 18 volts, and/or the current of the terminal 106 is 70 mA, then the terminal 106 is not fully charged, and there is no power disablement condition.

The power disablement condition can also be, for example, when a charge time of the terminal 106 exceeds a predetermined charge time threshold. The microcontroller 108 can also determine that the terminal 106 is fully charged based on the charge time. In one embodiment, the charge time can begin, for example, when the terminal 106 is initially connected to the converter unit 102. In another embodiment, the charge time can begin when the voltage of the terminal 106 remains stagnant for a predetermined period of time. By remaining stagnant for a predetermined period of time, the terminal 106 may be fully charged, even if the voltage does not exceed the predetermined voltage threshold. When the charge time begins, however, can be appropriately determined based on the terminal 106 or any other criteria. Once the charge time exceeds the predetermined charge time threshold, the microcontroller 108 instructs the latched relay 112 to disconnect the switch 119. This enables power conservation by preventing the converter unit 102 from drawing power when the terminal 106 is already full, nearly full, or has already been charged for an appropriate amount of time. Thus, even if the battery charger 100 is connected to the external power source, it does not draw power from the external power source.

The power disablement condition can also be, for example, when the terminal 106 is disconnected from the converter unit 102 and/or the battery charger 100. Thus, when the load monitor circuit 110 sends a signal to the microcontroller 108 that the terminal 106 is disconnected from the converter unit 102, the microcontroller 108 sends a signal to the latched relay 112 to disconnect the switch 119. This disables power reception by the battery charger 100 from the external power source even if the battery charger 100 is connected to the external power source.

In power disablement situations, power consumption by the converter unit 102 and/or the battery charger 100 does not perform any meaningful function, such as by charging a terminal 106, since the terminal 106 is already fully charged or disconnected from the converter unit 102 and/or the battery charger 100. Thus, by ceasing drawing power from the external power source in power disablement situations, power consumption of the converter unit 102 and/or the battery charger 100 can be reduced and efficiency of the converter unit 102 can be increased. For example, the user may not notice that the terminal 106 is fully charged. This is especially prevalent where the user is, for example, charging the terminal 106 overnight while the user is sleeping.

The power enablement condition can be, for example, when the terminal 106 is initially connected to the converter unit 102 and/or the battery charger 100. During the power enablement condition, the microcontroller 108 sends the signal to the latched relay 112 that the switch 119 should be connected. This can, for example, allow the converter unit 102 to draw power from the external power source and to charge the terminal 106.

In one embodiment, the power enablement condition can last for a predetermined time period even when the power disablement condition occurs. For example, if the electronic charger is fully charged when initially connected to the battery charger 100, the battery charger 100 can still enable power from the external power source for the predetermined time period. During the predetermined time period, the microcontroller 108 can, for example, determine whether the terminal 106 is full. In another embodiment, during the predetermined time period, the microcontroller 108 can determine if the disablement condition occurs and proceed with actions associated with the disablement condition after the predetermined time period has elapsed.

In another embodiment, the converter unit 102 can periodically wake up from the power disablement condition to monitor the terminal 106. The converter unit 102 can determine whether the power disablement condition still exists and whether to continue disabling power reception from an external power source or disabling the supply of power to the terminal 106. For example, the power enablement condition can occur when the terminal 106 is connected to the converter unit 102 and the power disablement time exceeds a predetermined power disablement time threshold. The power disablement time can commence when the power disablement condition is detected. For example, when the microcontroller 108 determines that the power disablement condition occurs, the power disablement time begins. The power disablement time can be reset when the power enablement condition exists and/or the converter unit 102 wakes up.

By ensuring that the power disablement time does not exceed the predetermined power disablement time threshold, the converter unit 102 can periodically monitor the charge status of the terminal 106. This prevents the terminal 106 from being fully charged, having the charging of the terminal 106 be disabled, and then having the terminal 106 be drained of its charge.

By detecting power enablement conditions, the converter unit 102 can anticipate when power consumption is necessary and/or will perform a meaningful function. This can reduce any inconvenience or impact for a user through the power consumption saving function of the battery charger 100.

As seen in FIG. 2, the converter unit 102 can also include a terminal input 121, a shell 128, and an indicator 130. The cable 104 can be connected, for example, to the terminal input 121. The terminal input 121 can be, for example, a universal serial bus (USB) input, an IEEE 1394 interface, a proprietary input specific to a terminal, or any other type of input that can be used to charge the rechargeable battery in the terminal and/or communicate with the converter unit 102. The shell 128 can be, for example, a housing which can house the components of the converter unit 102. The shell 128 can be formed from plastic, polymers, insulators, or any other type of material which can protect the components of the converter unit 102.

The indicator 130 can be an indicator regarding the battery charger 100. The indicator 130 can indicate, for example, whether the converter unit 102 is drawing power from the external power source, whether the converter unit 102 is supplying power to the terminal 106, the charge of the battery 116, or any other type of information that may be useful to a user with regards to power consumption of the battery charger 102. The indicator 130 can be, for example, a light indicator. The indicator 130 can receive power from the battery 116 and/or the external power source through the power switching unit 112, the power circuit 114, and/or the power input 118.

In one embodiment, the indicator 130 can display a first indication when the converter unit 102 is drawing power from the external power source and/or supplying the power to the terminal 106. The first indication can be, for example, a first color. The indicator 130 can display a second indication when the converter unit 102 is not drawing power from the external power source and/or not supplying power to the terminal 106. The second indication can be, for example, a second color or no indication at all. The indicator 130 can display a third indication when the converter unit 102 is not drawing power from the external power source, but is supplying power to the terminal 106. The third indication can be, for example, a third color or no indication at all.

Figure 4:
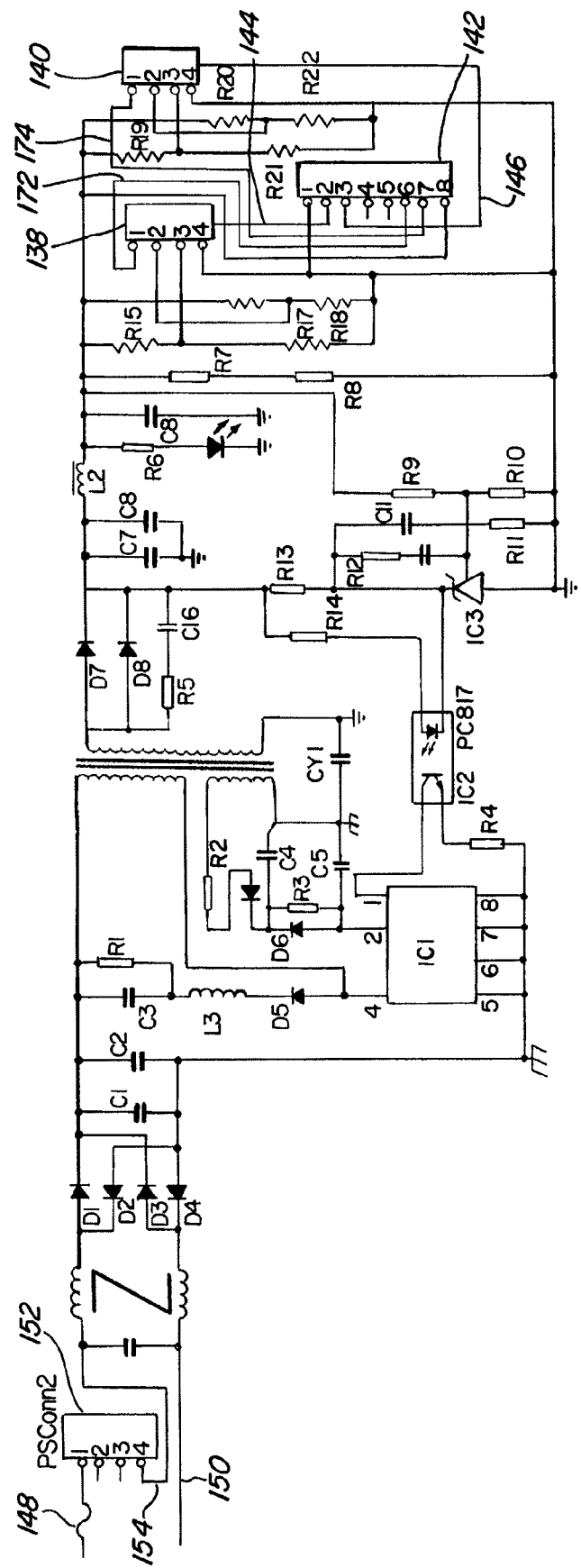
FIG. 4 is a circuit diagram of a portion of a converter unit according to an embodiment of the present invention.

Circuit diagrams of the converter unit 102 according to an embodiment of the present invention can be seen, for example, in FIGS. 4-7. As seen in FIG. 4, the terminal 106 can be connected to an input 138 or an input 140. The input 138 and the input 140 can be, for example, an input where the terminal 106 is connected to the battery charger 100 and/or the converter unit 102. For example, the cable 104 can be plugged into the input 138 and/or the input 140. The inputs 138 and 140 can be connected to pins 2 and 3 of a connection 142 through the lines 144 and 146, respectively. The inputs 138 and 140 can be connected to the pins 6 and 7 of the connection 142 through the lines 172 and 174, respectively.

Figure 5:
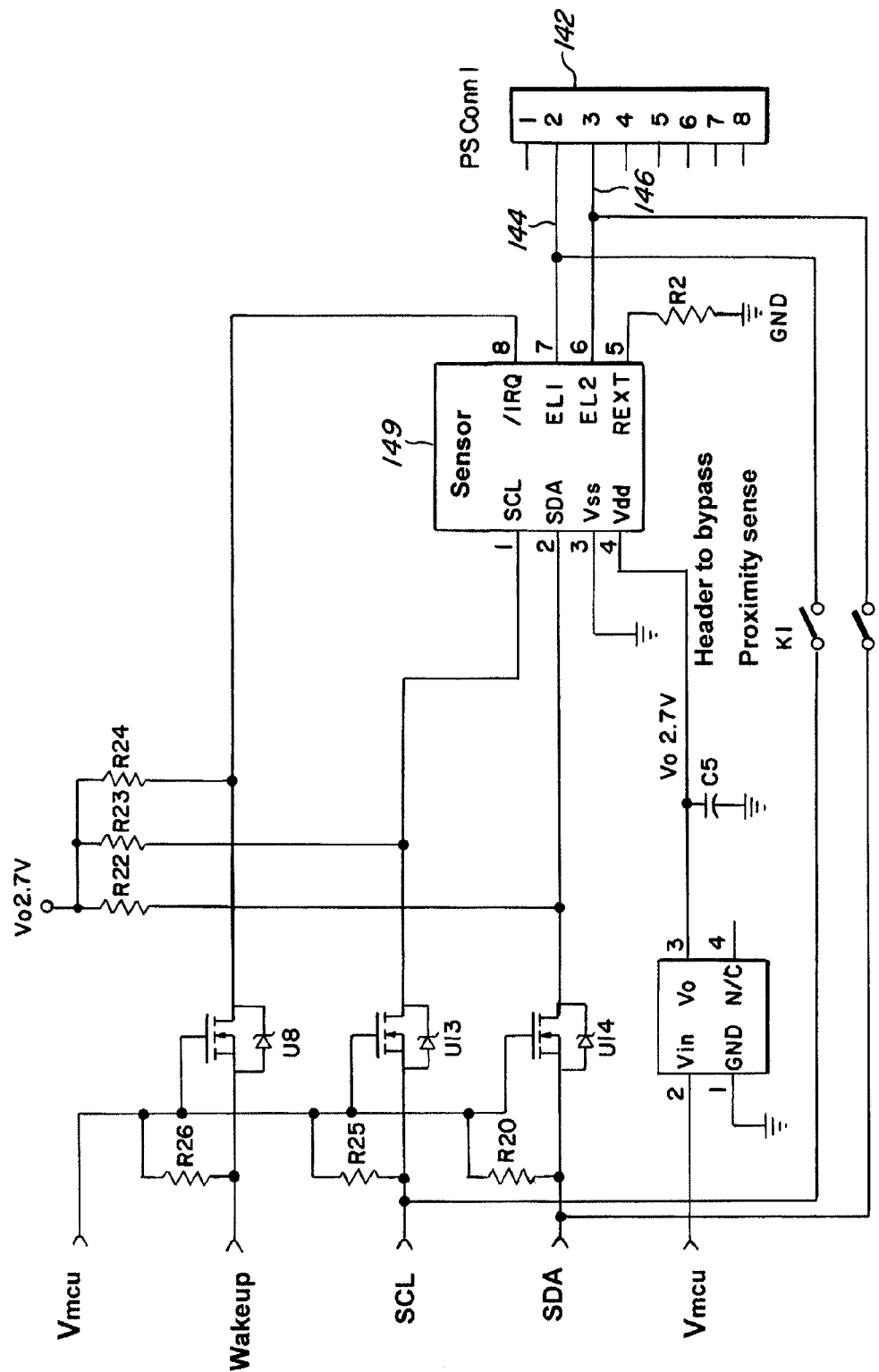
FIG. 5 is a circuit diagram of a portion of a converter unit according to an embodiment of the present invention.

As seen in FIG. 5, the pins 2 and 3 of the connection 142 can be used by a sensor 149 to detect whether the terminal 106 is connected to the converter unit 102 or not. The sensor 149 can detect, for example, a capacitance of the terminal 106 using the pins 2 and 3. The sensor 149 can also detect, for example, a capacitance of the cable 104 using the pins 2 and 3. The load monitor circuit 110 (FIG. 1) can include, for example, the sensor 149.

Figure 6:
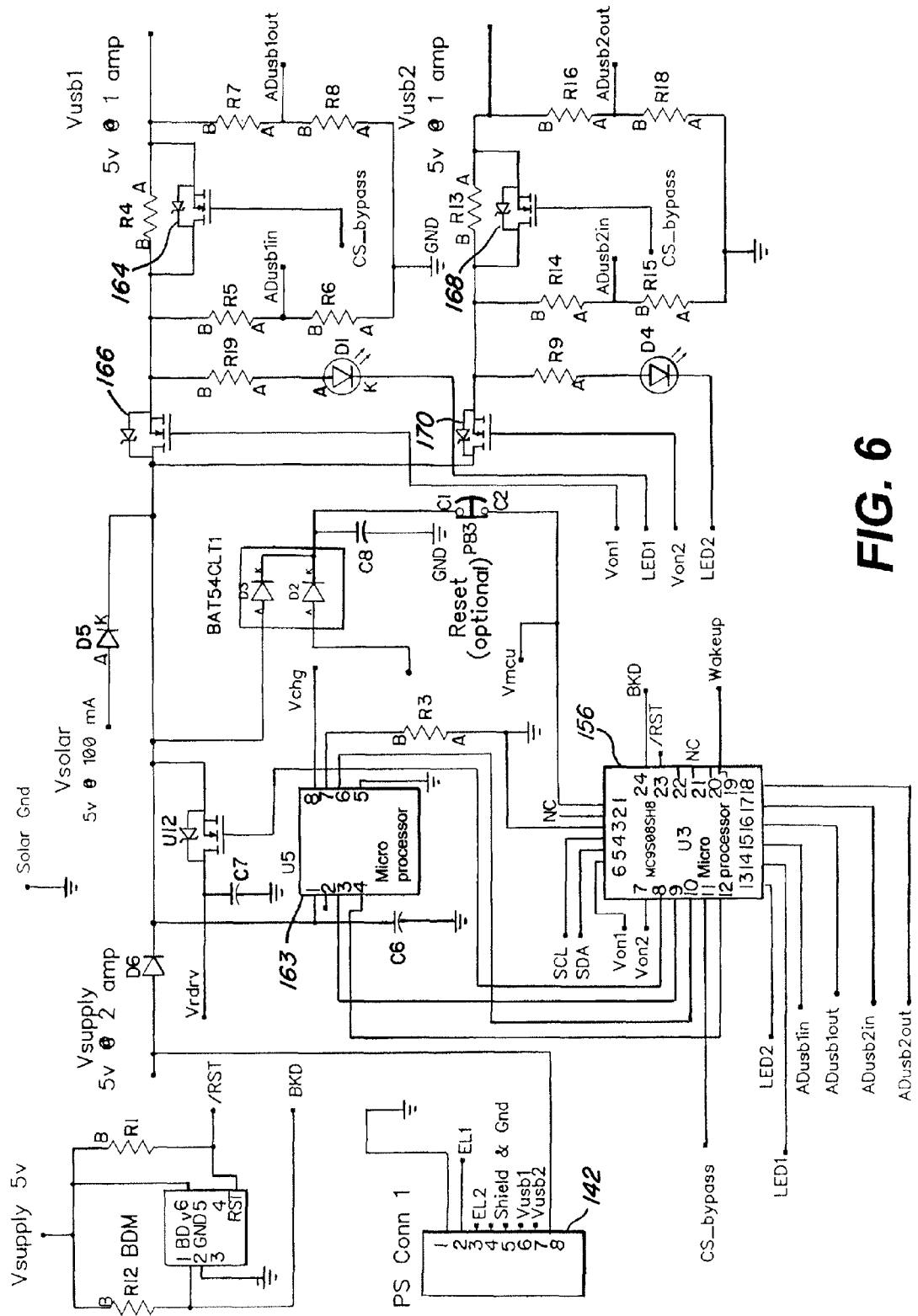
FIG. 6 is a circuit diagram of a portion of a converter unit according to an embodiment of the present invention.

As seen in FIGS. 5 and 6, the sensor 149 can transmit information regarding the terminal 106 to a microprocessor 156 using a voltage for microcontroller unit ("Vmcu") signal, a wakeup signal, a serial data access ("SDA") signal, and/or a serial clock line ("SCL") signal. The microcontroller 108 in FIG. 1 can include and/or correspond, for example, to the microprocessor 156. The information can include, for example, a capacitance of the terminal 106, a capacitance of the cable 104, whether the terminal 106 is connected, and/or whether the cable 104 has been touched.

As seen in FIG. 6, the microprocessor 156 receives the Vmcu signal, the wakeup signal, the SDA signal, and/or the SCL signal, and determines whether the terminal 106 is connected to the converter unit 102 and/or the battery charger 100. Referring to FIGS. 4 and 6, if the terminal 106 is connected to the converter unit 102 and/or the battery charger 100, the microprocessor 156 detects a voltage and/or current of the terminal 106 using the pins 6 and 7 of the connection 142. As previously noted, the pins 6 and 7 are connected to the inputs 138 and 140, which are connected to the terminal 106. The pins 6 and 7 can transmit the signals Vusb1 and/or Vusb2. The microprocessor 156 can also determine the charge time of the terminal 106, and whether the charge time exceeds the predetermined charge time threshold. The microprocessor 156 can then determine whether a power enablement condition or a power disablement condition has occurred.

Figure 7:
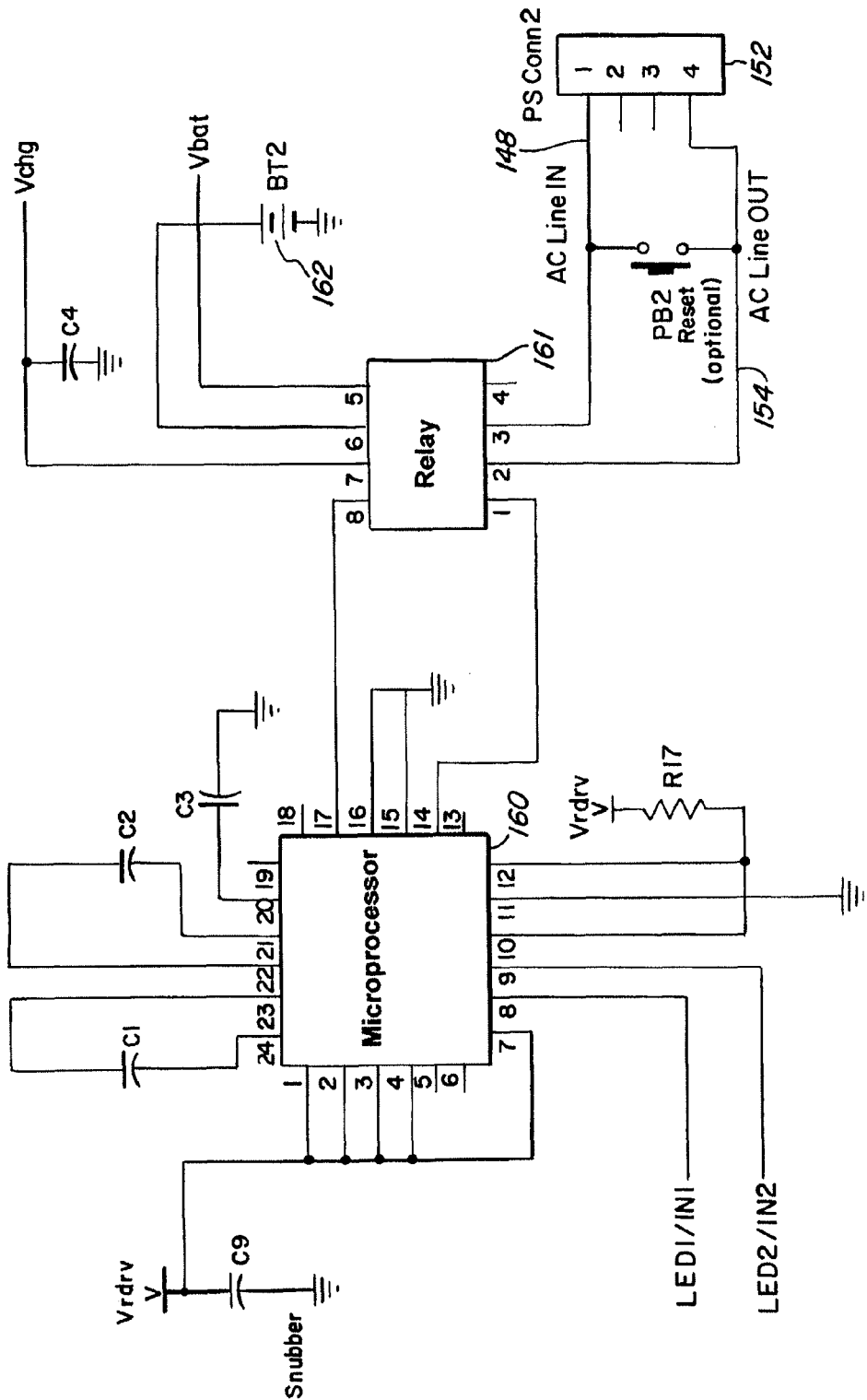
FIG. 7 is a circuit diagram of a portion of a converter unit according to an embodiment of the present invention.

As seen in FIGS. 6 and 7, the microprocessor 156 can send instructions, for example, to a microprocessor 160 using a LED1 signal and/or a LED2 signal based on whether the power enablement condition or the power disablement condition has occurred. Based on the instructions from the microprocessor 156, the microprocessor 160 can connect or disconnect pins in a relay 161. The latched relay 112 in FIG. 1 can include, for example, the microprocessor 160 and/or the relay 161. In one embodiment, when the pins 2 and 3 in the relay 161 are disconnected, the lines 148 and 154 do not form a complete circuit and no current flows through the lines 148 and 154. The pins 2 and 3 can be disconnected, for example, when the power disablement condition occurs. The switch 119 can correspond, for example, to the pins 2 and 3.

As seen in FIGS. 4 and 7, the lines 148 and 154 are connected to the pins 1 and 4 in the connection 152. In one embodiment, the lines 148 and a line 150 are lines which correspond to a main voltage input, such as the main voltage input 118 in FIG. 1. As previously noted, the main voltage input 118 is connected to an external power source. When the lines 148 and 154 are disconnected and no current flows through them, no current flows through the line 150 either since the line 150 requires current to flow through the lines 148 and 154 to complete a circuit. Thus, during the power disablement condition, no current flows to the converter unit 102 and the battery charger 100 does not draw power from the external power source.

During the power enablement condition, the lines 148 and 154 are connected, enabling the lines 148, 154, and 150 to complete a circuit. This allows power to flow to the converter unit 102 using the lines 148, 154, and/or the lines 150. As can be seen in FIG. 4, power flowing through the lines 148, 154, and/or the lines 150 also reaches the terminal 106 through the inputs 138, 140, and/or the connection 142. Furthermore, as seen in FIGS. 4 and 6, the current flowing to the terminal 106 through the inputs 138 and 140 are monitored by diodes 164, 166, 168, and 170 using the pins 6 and 7 and the signals Vusb1 and Vusb2 for the connection 142.

Referring back to FIG. 7, when the pins 6 and/or 7 are disconnected from the relay 161, they do not form a complete circuit for the battery 162 and no current flows to the battery 162 or the microprocessor 163. The Vchg line connected to pin 7 is connected to a microprocessor 163 as shown in FIG. 6. The microprocessor 163 can monitor an energy level of the battery 162. The battery 162 can be, for example, a rechargeable battery, a supercap, a solar cell, renewable energy devices, and/or any other type of energy storage device. In FIG. 1, the battery monitor and charging circuit 114 can include, for example, the microprocessor 163, while the battery 116 can correspond to the battery 162.

As seen in FIG. 6, the microprocessor 163 can send information regarding the battery 162 to the microprocessor 156. The microprocessor 163 can include, for example, information regarding the energy level of the battery 162. When the energy level of the battery 162 is above a predetermined energy threshold, the microprocessor 156 can instruct the microprocessor 160 to disconnect the pins 6 and 7. Thus, even when power is flowing from the external power source to the terminal 106, the battery 162 will not be charged.

However, when the energy level of the battery 162 is below a predetermined energy threshold, the microprocessor 156 can instruct the microprocessor 160 to connect the pins 6 and 7 in the relay 161 and the line Vchg and the line to the battery 162. In one embodiment, the pin 8 can also be disconnected. The microprocessor 160 can also instruct the microprocessor 160 to connect the pins 2 and 3 and the lines 148 and the lines 154 enabling the power to flow from the external power source to the converter unit 102 and the battery 162.

Figure 8:
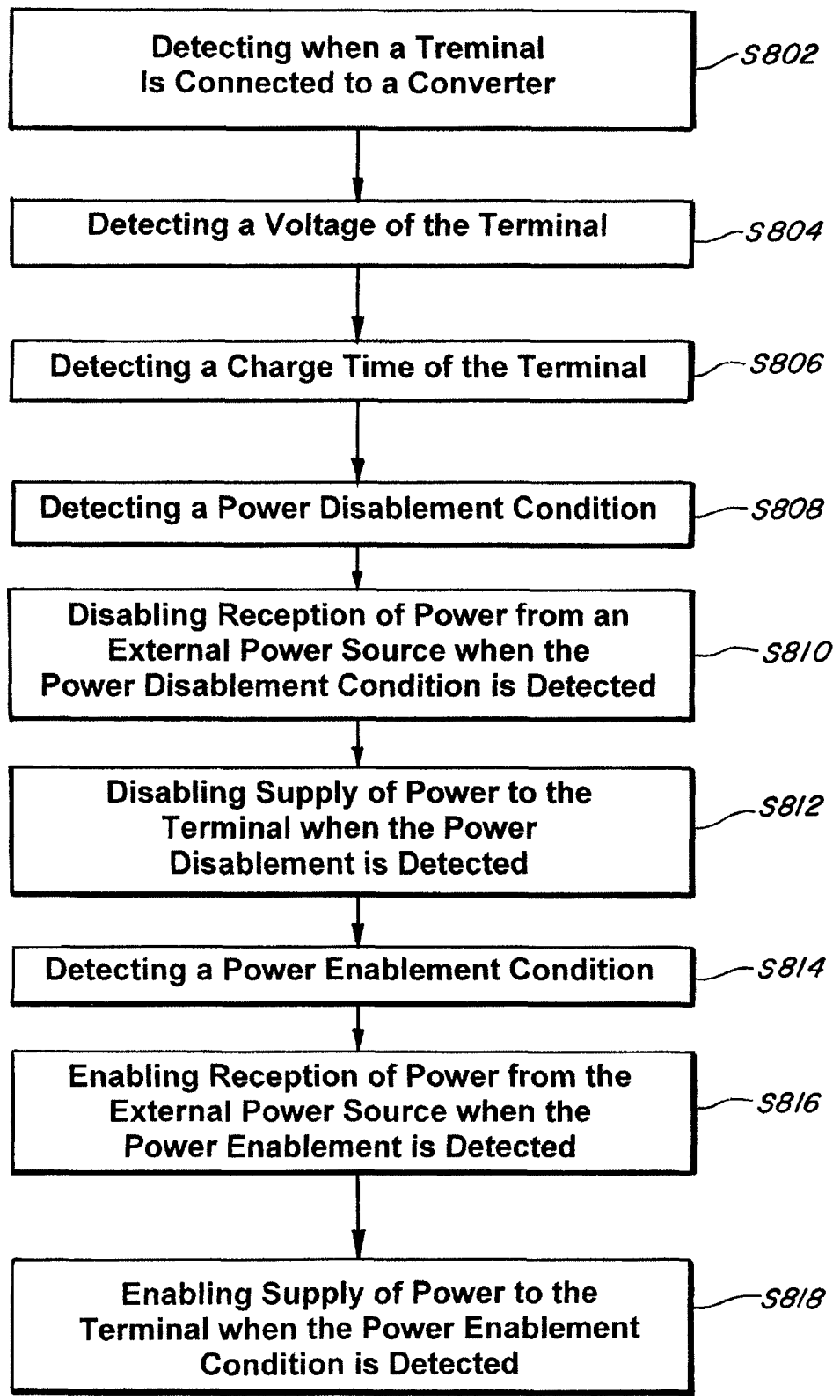
FIG. 8 is a flow chart of a process according to an embodiment of the present invention.

In one embodiment, the present invention is a process as seen in FIG. 8. In Step S802 detection of whether a terminal 106 adaptor is electrically connected to a converter unit is performed. For example, the load monitor circuit 110 can detect whether the terminal 106 is connected to the converter unit 102. In Step S804, a voltage of the terminal 106 is detected. For example, the microcontroller 108 detects a voltage of the terminal 106. In Step S806, a charge time of the terminal 106 is detected. For example, the microcontroller 108 can detected the charge time using the load monitor circuit 110.

As seen in FIGS. 6 and 7, the converter unit 102 can also include optional reset switches. Furthermore, additional optional components are also shown in FIGS. 4-7, which can be removed or substituted for different components. Also, additional components may also be added to the converter unit 102.

In Step S808, a power disablement condition is detected. For example, the microcontroller 108 can detect and determine whether the power disablement condition has occurred or not. In Step S810, reception of power from an external power source is disabled when the power disablement condition is detected. For example, when the power disablement condition is detected, the microcontroller 108 instructs the latched relay 112 to disconnect the switch 119. In Step S812, the supply of power to the terminal 106 is disabled. For example, by disconnecting the switch 119, the converter unit 102 does not receive power and thus no power is supplied to the terminal 106.

In Step S814, a power enablement condition is detected. For example, the microcontroller 108 can detect the power enablement condition. In Step S816 when the power enablement condition is detected, reception of power from an external source is enabled. For example, when the power enablement condition is detected by the microcontroller 108, the microcontroller 108 instructs the latched relay 112 to connect the switch 119. In Step S818, when the power enablement condition is detected, supply of power to the terminal 106 is enabled. For example, when the switch 119 is connected, power flows from the external power source to the converter unit 102 and from the converter unit 102 to the terminal 106.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. Furthermore the method and/or algorithm need not be performed in the exact order described, but instead may be varied. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. An electric charge cutoff device for delivering power to a terminal, comprising:
    a housing;
    a terminal adaptor connectable to the terminal;
    a cable for extending from the housing and connected to the terminal adaptor;
    a power connector plug connected to the housing and configured to receive power from a power source external to the housing;
    a sensor circuit positioned within the housing and for electrically coupling to the cable, and configured to detect a variation in a capacitance of the cable;
    a latched relay positioned within the housing and electrically coupled to the power connector plug and configured to electrically couple to the terminal adaptor, and configured to disable reception of power by the power connector plug from the power source in response to the sensor circuit detecting the variation in the capacitance of the cable; and
    a renewable energy source positioned within the housing and electrically coupled to the sensor circuit, and configured to provide power to the sensor circuit when reception of power by the power connector plug from the power source is disabled.

2. The electric charge cutoff device of claim 1, wherein the cable is configured such that the variation in the capacitance of the cable is caused by the terminal adaptor being disconnected from the terminal.

3. The electric charge cutoff device of claim 1, further comprising a microcontroller electrically coupled to the sensor circuit and the latched relay, and configured to send a signal to the latched relay indicating that the sensor circuit detected the variation in the capacitance of the cable.

4. The electric charge cutoff device of claim 3, wherein the microcontroller is configured to send a signal to the latched relay indicating that the latched relay is to enable reception of power by the power connector plug from the power source.

5. The electric charge cutoff device of claim 4, wherein the microcontroller is configured to send the signal to the latched relay indicating that the latched relay is to enable reception of power by the power connector plug in response to the sensor circuit detecting a variation in the capacitance of the cable.

6. The electric charge cutoff device of claim 3, wherein the renewable energy source is electrically coupled to the microcontroller and is configured to provide power to the microcontroller when reception of power by the power connector plug from the power source is disabled.

7. The electric charge cutoff device of claim 1, wherein the renewable energy source is a rechargeable battery.

8. The electric charge cutoff device of claim 7, further comprising a battery monitor electrically coupled to the rechargeable battery and configured to determine a charge level of the rechargeable battery.

9. The electric charge cutoff device of claim 8, wherein the battery monitor is configured to cause the latched relay to enable reception of power by the power connector plug from the power source for delivery to the rechargeable battery in response to the charge level detected by the battery monitor.

10. A charger for delivering power to a battery of a terminal, comprising:
    a housing;
    a terminal adaptor connectible to the terminal;
    a cable for extending from the housing and connected to the terminal adaptor, and configured such that a capacitance of the cable varies in response to the terminal adaptor being disconnected from the terminal;
    a power connector plug connected to the housing and configured to receive power from a power source external to the housing;
    a sensor circuit positioned within the housing and for electrically coupling to the cable, and configured to detect a variation in the capacitance of the cable in response to the terminal adaptor being disconnected from the terminal; and
    a switch positioned within the housing and electrically coupled to the power connector plug and configured to electrically couple to the terminal adaptor, and configured to disable reception of power by the power connector plug from the power source in response to the sensor circuit detecting the variation in the capacitance of the cable.

11. The charger of claim 10, further comprising a microcontroller electrically coupled to the sensor circuit and the switch, and configured to send a signal to the switch indicating that the sensor circuit detected the variation in the capacitance of the cable.

12. The charger of claim 11, wherein the microcontroller is configured to send a signal to the switch indicating that the switch is to enable reception of power by the power connector plug from the power source.

13. The charger of claim 12, wherein the sensor circuit is configured to detect a variation in the capacitance of the cable in response to the terminal adaptor being connected to the terminal.

14. The charger of claim 13, wherein the microcontroller is configured to send the signal to the switch indicating that the switch is to enable reception of power by the power connector plug in response to the terminal adaptor being connected to the terminal.

15. The charger of claim 10, further comprising a renewable energy source positioned within the housing and configured to provide power to the sensor circuit when reception of power by the power connector plug from the power source is disabled.

16. The charger of claim 15, further comprising a battery monitor electrically coupled to the renewable energy source and configured to determine a power level of the renewable energy source, and configured to cause the switch to enable reception of power by the power connector plug from the power source for delivery to the renewable energy source in response to the power level detected by the battery monitor.

17. A method for disabling power to a converter unit comprising:
   detecting, using a sensor circuit, a variation in a capacitance of a cable that extends from a housing of the converter unit, the sensor circuit being positioned within the housing;
   disabling, using a latched relay, reception of power into the housing from an external power source when the variation in the capacitance is detected, the latched relay being positioned within the housing; and
   powering the sensor circuit with a renewable energy source when the power is disabled from being received into the housing, the renewable energy source being positioned within the housing.

18. The method of claim 17, wherein the variation in the capacitance of the cable is caused by the cable being disconnected from a terminal that the cable is configured to deliver power to.

19. The method of claim 17, further comprising enabling, using the latched relay, reception of power into the housing from the external power source when a variation in the capacitance of the cable is detected by the sensor circuit.

20. The method of claim 19, further comprising supplying power to a battery of a terminal that the cable is connected to when reception of power into the housing from the external power source is enabled.

* * * * *